Nov. 19, 1957    O. W. BONNAFE    2,813,462
WORK-HOLDING FIXTURE FOR MACHINE TOOL
Filed April 5, 1954    3 Sheets-Sheet 1

INVENTOR.
OLIVER W. BONNAFE.
BY
Chas. T. Hawley
ATTY.

INVENTOR.
OLIVER W. BONNAFE.
BY
Chas. N. Hawley
ATTY.

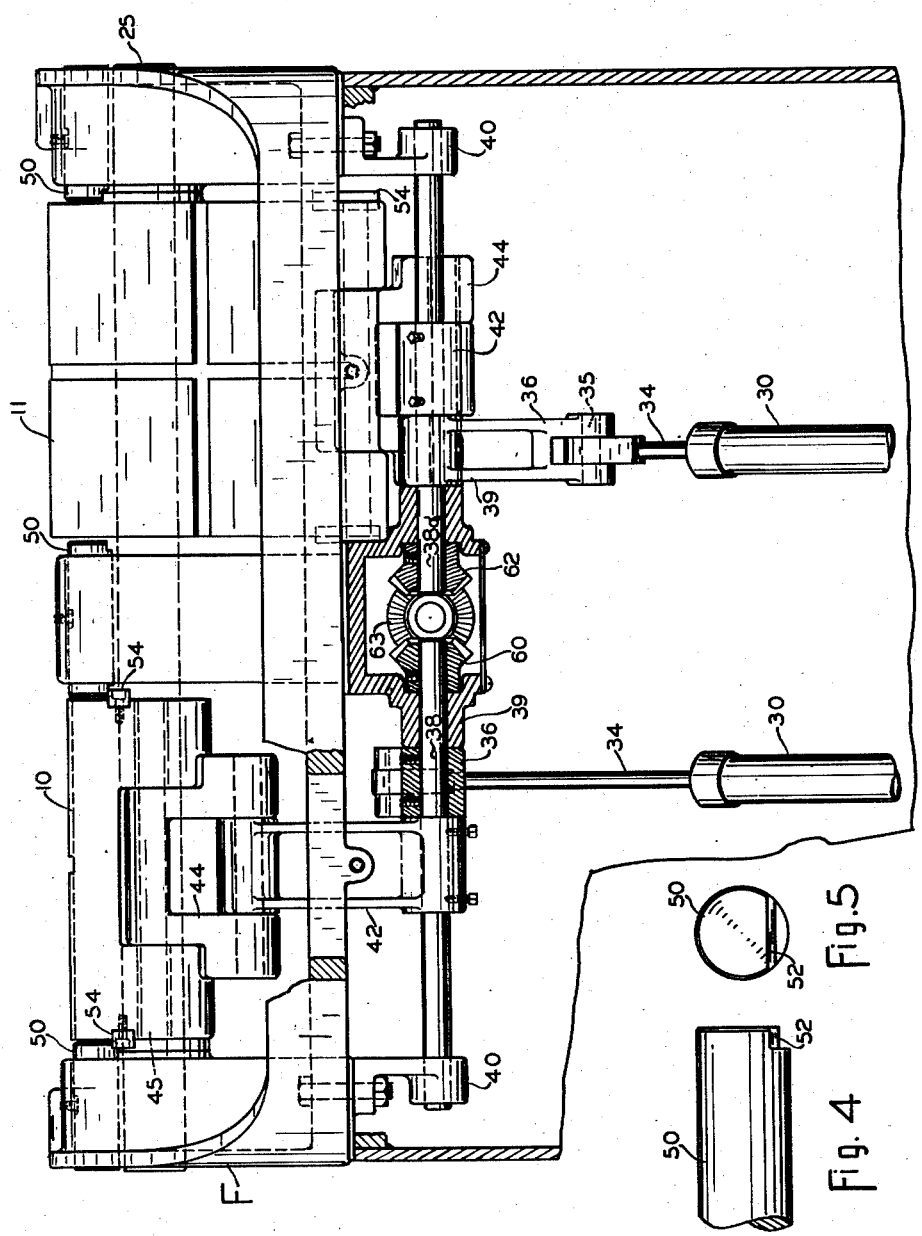

United States Patent Office 2,813,462
Patented Nov. 19, 1957

2,813,462
WORK-HOLDING FIXTURE FOR MACHINE TOOL

Oliver W. Bonnafe, Hudson, Mass., assignor to The Lapointe Machine Tool Company, Hudson, Mass., a corporation of Maine Application April 5, 1954, Serial No. 420,799

1 Claim. (Cl. 90—33)

This invention relates to a fixture designed to hold a piece of work in position for operation in a machine tool. The fixture is particularly designed for use in a duplex vertical broaching machine but is not limited in its utility to use in any particular type of machine tool.

It is one important object of the invention to provide a fixture having a work-holder which will rigidly support a piece of work in operative position, together with effective means for removing the work-holder to a more accessible reloading position.

A further object is to provide operative mechanism for a pair of work-holders so constructed that reverse positioning of the work-holders and reverse movements thereof are assured.

The invention further relates to arrangements and combinations of parts which will be hereinafter described and more particularly pointed out in the appended claim.

A preferred form of the invention is shown in the drawings, in which:

Fig. 3 is a partial front view, looking in the direction of the arrow 3 in Fig. 2;

Fig. 4 is a partial side elevation of a stop or abutment; and

Fig. 5 is an end view of the stop shown in Fig. 4.

Figure 1:
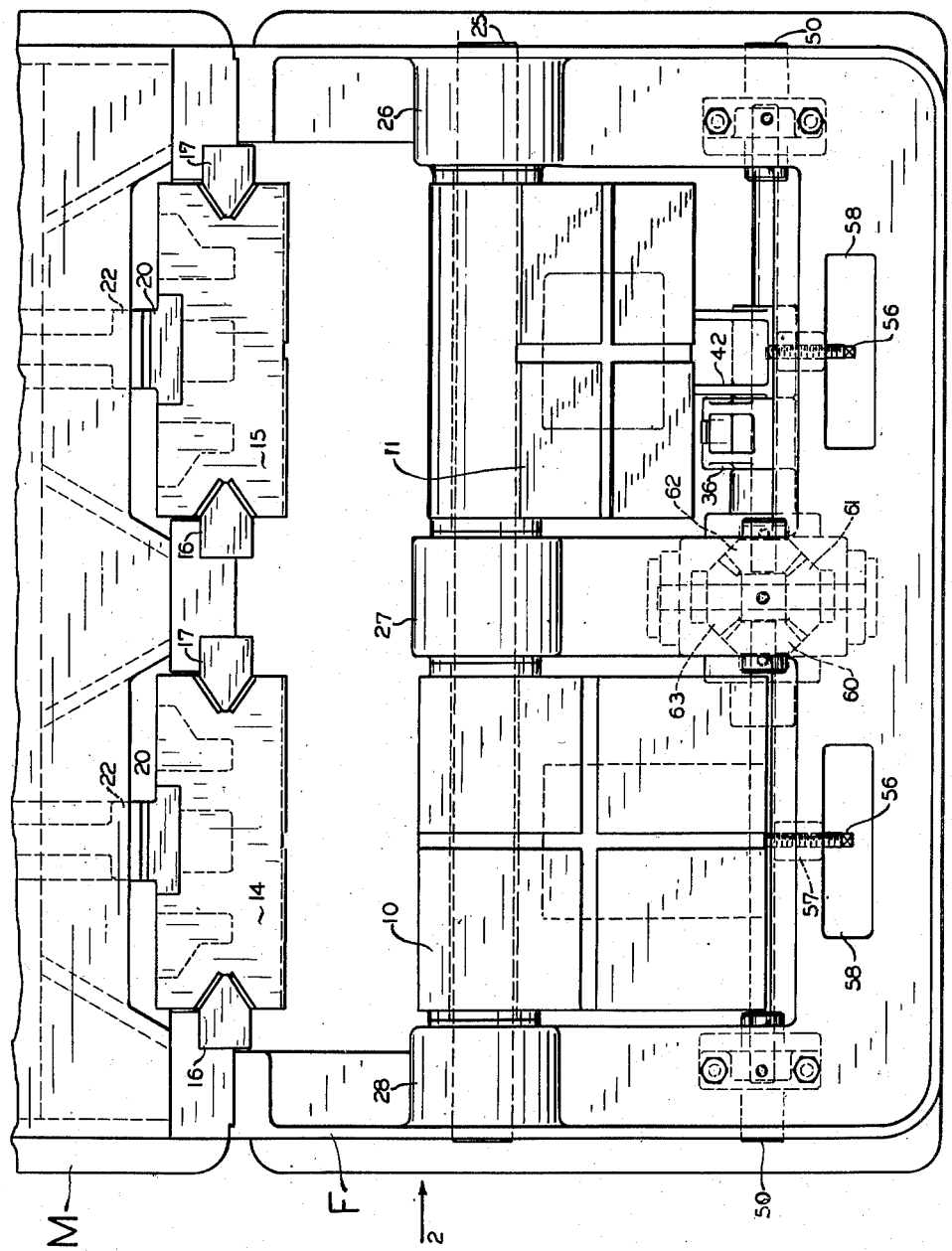
Fig. 1 is a plan view of an associated pair of work-holding fixtures.

Referring to Fig. 1, duplicate work-holders 10 and 11 supporting work pieces W are shown as mounted in a duplex broaching machine M having vertically reciprocated tool slides 14 and 15 to which broaches B are secured. The slides 14 and 15 are slidable in pairs of fixed guide-bars 16 and 17, and each slide has a rack bar 20 secured to the rear face thereof and engaged by a power-driven gear 22.

The operating mechanism for the tool slides forms no part of the present invention but constitutes the subject matter of a copending application.

The work-holding fixtures 10 and 11 are of duplicate construction, and a description of one of these work-holding fixtures and its operating mechanism will apply equally to the other work-holding fixture.

Figure 2:
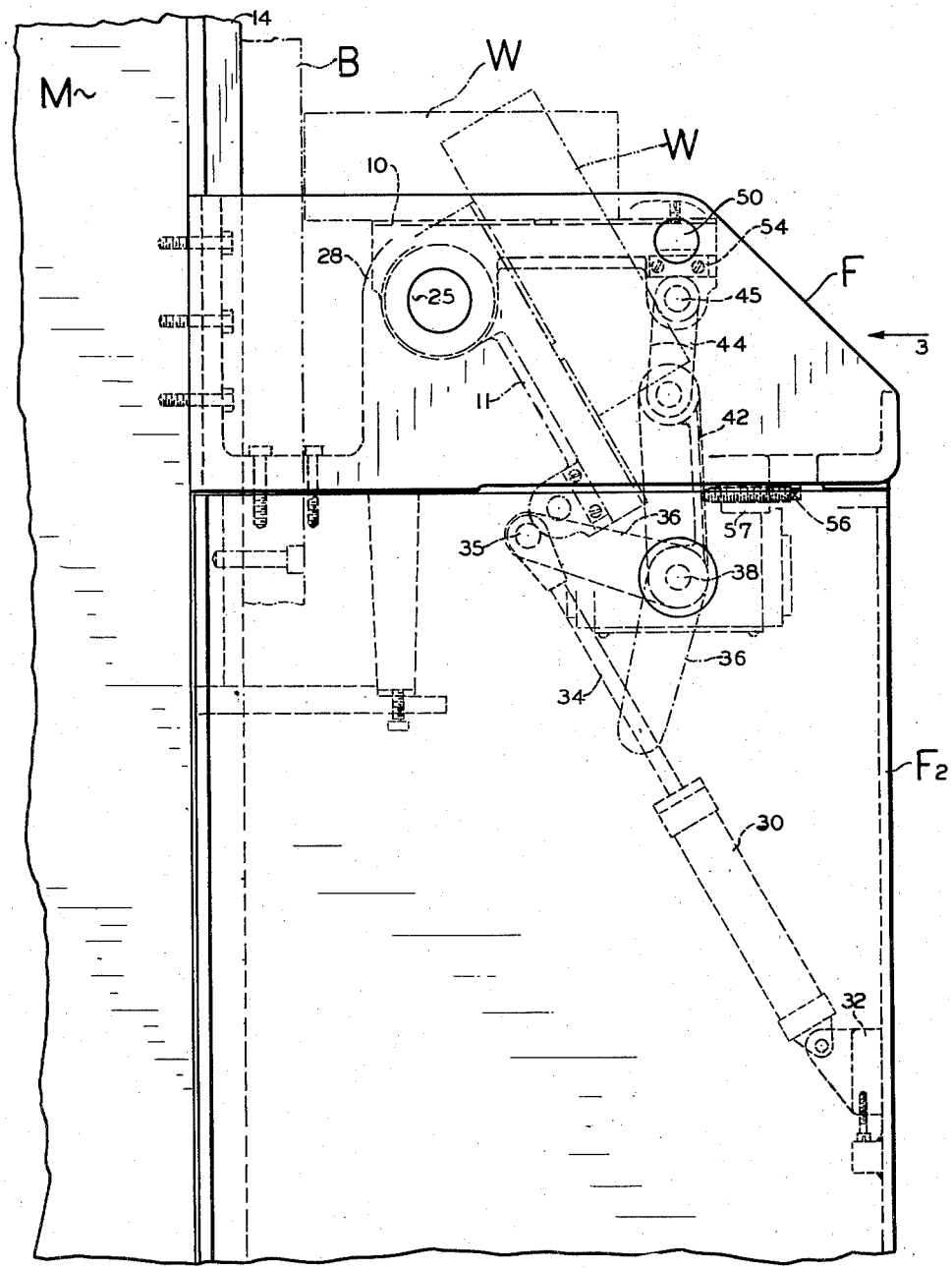
Fig. 2 is a partial side elevation, looking in the direction of the arrow 2 in Fig. 1.

Referring to Fig. 2, a piece of work W is shown mounted on the work-holder 10 which is pivoted on a shaft 25 mounted in bearings 26, 27 and 28 (Fig. 1) which are fixed on the fixture frame or base F.

A hydraulic cylinder 30 (Fig. 2) is pivoted at its lower end to a bearing block 32 which is vertically adjustable on a frame member F2. A piston in the cylinder 30 has a piston rod 34 which is pivotally connected at 35 to a crank arm 36 secured to a crankshaft 38. The shaft 38 is mounted in fixed bearings 39 and 40 (Fig. 3), and a second crank arm 42 is secured to the shaft 38 in angular relation to the arm 36. The crank-arm 42 is connected by a link 44 to a pivot rod 45 fixed in the work-holder 10 and adjacent to the free or swinging edge thereof.

Stops or abutments 50 (Figs. 3 to 5) are mounted in fixed frame portions and project into the paths of the swinging work-holders 10 and 11 to limit the upward swinging movement thereof. These stops 50 are preferably slabbed off at their operative ends as indicated in Figs. 4 and 5, and may have wear strips 52 of hard steel welded or otherwise secured thereto.

Steel bars 54 (Figs. 2 and 3) are secured to the edges of the work-holders and engage the stops 50 as each holder is swung upward to working position.

Obviously, with hydraulic operation, the work-holder will be moved until the bars 54 firmly engage the stops 50, and the holder will be held under firm pressure against these stops. It will be noted also that the work W (Fig. 2) extends rearward of the axis of the shaft 25, so that the downwardly-moving tool engages the rear portion of the work and presses the bars 54 upward against the stops 50.

Stop screws 56 (Figs. 1 and 2) may be mounted in fixed blocks 57 and may be adjusted to engage the arms 42 as the associated work-holder engages the stops 50. Holes 58 in the frame F provide access to the screws 56.

When a work-holder, as 10, is in the raised position shown in Fig. 2, a downwardly-directed broaching stroke is performed on the work. At the same time, the second work-holder 11 is in the inclined lowered position also shown in Fig. 2. When in this position, the work-holder is readily accessible and the work may be readily removed and replaced without interference with the broach B. This removal and replacement of the work may take place, at least in part, during the return movement of the associated broach and during the working stroke of the broach associated with the other work-holder.

To ensure that the work-holders are reversely operated, and to prevent placing both work-holders in operative position at the same time, I have connected the crankshafts 38 and 38a of the two work-holders through a set of bevel gears 60, 61, 62 and 63. The bevel gears 60 and 62 are fixed to the crankshafts 38 and 38a respectively, while the bevel gears 61 and 63 are idle gears. The operating cylinders 30 are also preferably cross-connected.

With this gear connection, the shaft 38a must always move simultaneously and equally with the shaft 38 but in a reverse direction.

Any usual provision may be made for supplying a fluid under pressure alternately to the opposite ends of the cylinders 30, and it will be noted that the crank arms 42 and links 44 do not quite pass the dead center in raising a work-holder, so that no excessive resistance is encountered as the downward or return movement of the work-holder begins.

Having thus described my invention and the advantages thereof, I do not wish to be limited to the details herein disclosed, otherwise than as set forth in the claims, but what I claim is:

Work-holding structure for a duplex vertical broaching machine which comprises a pair of adjacent work-holders, separate horizontal shafts pivotally supporting said workholders for swinging movement about a single fixed horizontal axis to alternately present pieces of work in position for tool operations thereon, a stop for each work-holder, fixed bearings for said horizontal shafts which extend parallel to the plane of cutting action of the two broaches, separate power means to selectively rotate each horizontal shaft and to thereby raise the associated work-holder to broaching position, and a triple bevel gear connection between said two shafts by which said shafts are constrained at all times to move equally and oppositely.

(References on following page)

References Cited in the file of this patent

UNITED STATES PATENTS

| | | |
|---|---|---|
| 2,043,420 | Roehm | June 9, 1936 |
| 2,047,034 | Roehm et al. | July 7, 1936 |
| 2,052,248 | Roehm | Aug. 25, 1936 |
| 2,190,067 | Hart | Feb. 13, 1940 |
| 2,264,497 | Agan | Dec. 2, 1941 |
| 2,372,825 | Grad | Apr. 3, 1945 |
| 2,385,119 | Welte | Sept. 18, 1945 |
| 2,425,982 | Bazley | Aug. 19, 1947 |
| 2,626,542 | Triteline et al. | Jan. 27, 1953 |